United States Patent [19]

Hamada

[11] Patent Number: 5,200,268

[45] Date of Patent: Apr. 6, 1993

[54] STICK-ADHESIVE COMPOSITION, A STICK-ADHESIVE COMPOSITION LAYER, AND A TRANSFER SHEET WITH THE LAYER

[76] Inventor: Hideo Hamada, 15-401, Kawanaka-Shinmachi, Daito-shi, Osaka 574, Japan

[21] Appl. No.: 678,461

[22] Filed: Apr. 1, 1991

[51] Int. Cl.$^5$ .............................................. B32B 7/12
[52] U.S. Cl. .................................. 428/354; 525/123; 525/131; 428/40; 428/202; 428/343; 428/352; 428/355
[58] Field of Search ................. 525/131, 123; 428/40, 428/352, 354, 355, 343, 202

[56] References Cited

U.S. PATENT DOCUMENTS

| | | | |
|---|---|---|---|
| 4,731,416 | 3/1988 | Saunders | 525/131 |
| 4,758,625 | 7/1988 | Boyack et al. | 525/123 |
| 4,766,177 | 8/1988 | Miller et al. | 525/131 |
| 4,929,486 | 5/1990 | Itou et al. | 428/352 X |
| 4,987,186 | 1/1991 | Akiyama et al. | 525/123 X |
| 4,988,767 | 1/1991 | Pettit, Jr. | 525/131 X |
| 5,024,867 | 6/1991 | Iwabuchi | 428/354 X |
| 5,061,749 | 10/1991 | Ito et al. | 525/123 X |

FOREIGN PATENT DOCUMENTS 51-6235 1/1976 Japan.
61-66631 4/1986 Japan.
63-10680 1/1988 Japan.

*Primary Examiner*—George F. Lesmes
*Assistant Examiner*—D. R. Zirker
*Attorney, Agent, or Firm*—Armstrong, Westerman, Hattori, McLeland & Naughton

[57] ABSTRACT

The invention relates to a transfer sheet comprising a release sheet, a stick-adhesive layer disposed on the releasable side of the release sheet and formed from the stick-adhesive composition comprising a sticking resin and a moisture-curing resin in a weight ratio of 90:10 through 20:80 based on the nonvolatile matter thereof, a main transfer layer disposed on the stick-adhesive layer, and a moisture-proofing means disposed on the main transfer layer and adapted to maintain the stick-adhesive layer in moisture-free condition.

2 Claims, 1 Drawing Sheet

STICK-ADHESIVE COMPOSITION, A STICK-ADHESIVE COMPOSITION LAYER, AND A TRANSFER SHEET WITH THE LAYER

FIELD OF THE INVENTION

The present invention relates to a stick-adhesive composition which, after application to a substrate or adherend, undergoes transition from a sticking agent to an adhesive agent with the progress of time. The invention relates, in a further aspect, to a layer formed from said stick-adhesive composition. In a still further aspect, the invention relates to a transfer sheet having the same layer.

BACKGROUND OF THE INVENTION

Sheets and the like materials each carrying a sticking layer offer the advantage that they can be stuck to substrates with so-called "fingertip ease" but are deficient in bonding strength and resistance to slip stress because of the inherent nature of the sticking agent. On the other hand, sheets and other materials each carrying an adhesive layer insure permanent bonding to adherends but require not only subsequent drying or heating but also application of a pressure over a certain time period, thus being inferior in workability.

The foregoing suggests that if a stick-adhesive composition that would undergo spontaneous transition from a sticking agent to an adhesive agent after application to any adherend should ever be developed, both the demand for ease of application and the demand for permanent adhesion could be successfully reconciled and satisfied.

Much research has been undertaken into stick-adhesive agents. By way of illustration, Japanese Kokai Tokkyo Koho No. 63-10680 discloses a stick-adhesive composition comprising a monofunctional acrylic monomer, a compound containing two or more acryloyl groups, a compound containing two or more epoxy groups and a masked epoxy-curing agent.

Japanese Kokai Tokkyo Koho No. 51-6235 discloses a stick-adhesive composition comprising a mixture of n-butyl acrylate and 2-ethylhexyl acrylate, a functional vinyl monomer and a vinyl monomer copolymerizable therewith.

Furthermore, Japanese Kokai Tokkyo Koho No. 61-66631 describes a continuous lapping method for cladding a piece of furniture or an architectural member with a decorative sheet employing a stick-adhesive composition of the urethane prepolymer type which comprises paying out an endless decorative sheet from a roll, applying said stick-adhesive composition to the reverse side of said decorative sheet in the course of its travel, drying the same and applying the sheet to the furniture or architectural member through a roll set adapted to compress the sheet against said member in registry with the surface pattern of the latter. The stick-adhesive composition employed in this method develops a pressure-sticking property within 8 hours after evaporation of the coating solvent and, thereafter, an adhesive property as the curing reaction proceeds in line with progressive absorption of moisture with or without the aid of a curing component.

However, the stick-adhesive composition proposed in Japanese Kokai Tokkyo Koho No. 63-10680 has the disadvantage that heating is required for the conversion from a sticking agent to a bonding agent. The stick-adhesive composition described in Japanese Kokai Tokkyo Koho No. 51-6235 is also disadvantageous in that heat curing is required after application to the substrate. This need for a post-heating procedure for said conversion from a sticking agent to an adhesive agent is not only an economic deterrent because this requires additional work after application but a serious limiting factor in the utility of the composition because it cannot be utilized in applications where heat is abhorred or in the art of transfer printing sheets which are to remain on the substrates.

The stick-adhesive composition according to Japanese Kokai Tokkyo Koho No. 61-66631 is subject to a time limit that its pressure adhesivity is available only up to 8 hours after evaporation of the coating solvent. Moreover, it can never be used for transfer sheets which are marketed in the condition preformed with a stick-adhesive layer.

It is, therefore, an object of the present invention to provide a stick-adhesive composition with which a final product can be marketed as carrying a stick adhesive layer and applied to the substrate by simple pressing as it is the case with the conventional adhesive material and which provides a permanent bond as it is simply allowed to stand and undergo spontaneous transition from a sticking agent to an adhesive agent with the progress of time after application.

It is another object of the invention to provide a stick-adhesive layer formed from such stick-adhesive composition.

It is a further object of the invention to provide a transfer sheet having said stick-adhesive layer.

SUMMARY OF THE INVENTION

The present invention provides a stick-adhesive composition which undergoes spontaneous transition from a sticking agent to an adhesive agent with the progress of time after application, which composition comprises a sticking resin and a moisture-curing resin in a weight ratio of 90:10 through 20:80 based on the nonvolatile matter thereof.

The stick-adhesive layer according to the present invention comprises a layer formed from the abovedefined stick-adhesive composition wherein said moisturecuring resin exists continually from one surface of the same layer to the other side.

The transfer sheet according to the present invention comprises a release sheet, a stick-adhesive layer disposed on the releasable side of said release sheet and formed from said stick-adhesive composition containing a sticking resin and a moisture-curing resin in a weight ratio of 90:10 through 20:80 on a nonvolatile matter basis, a main transfer layer disposed on top of said stick-adhesive layer, and a moisture-proofing means for maintaining said stick-adhesive layer in moisture-free condition.

DETAILED DESCRIPTION OF THE INVENTION

Figure 1:
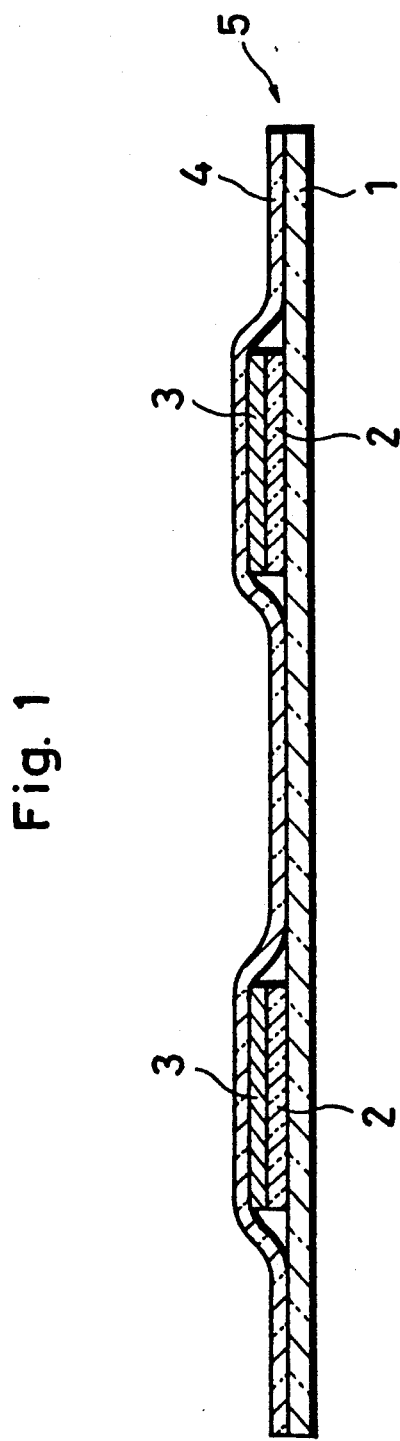
FIG. 1 is a schematic cross-section view illustrating an exemplary transfer sheet according to the invention.

In accordance with the present invention, it is essential that the stick-adhesive composition contains a sticking resin and a moisture-curing resin in a weight ratio of 90:10 through 20:80 on a nonvolatile matter basis.

The sticking resin includes, inter alia, acrylic, silicone, rubber, vinyl, urethane and ultraviolet curing resins which have sticking properties particularly useful are acrylic sticking resins. Such an acrylic sticking resin can be prepared by copolymerizing a soft segment component consisting in an alkyl($C_{about\ 4-12}$) (meth)acrylate such as butyl acrylate, 2-ethylhexyl acrylate or the like, a hard segment component consisting of a short-chain alkyl (meth)acrylate, vinyl acetate or the like, and a functional component such as an ethylenically unsaturated carboxylic acid, a hydroxy (meth)acrylate or the like in appropriate proportions.

Depending on the type of sticking resin, a tackifying agent and/or a softening agent can be used in conjunction. It is also possible to incorporate, where necessary, an aging inhibitor, filler, vulcanizing agent, crosslinking agent, colorant, antifoam, leveling agent and other additives in the aforesaid sticking resin.

The moisture-curing resin is preferably a resin for one-package NCO-terminated polyurethane adhesive compositions, for example the resins obtainable by reacting a polyisocyanate compound such as tolylene diisocyanate, diphenylmethane diisocyanate or the like with a polyol such as a polyether polyol (e.g. polyoxypropylenediol, polytetramethylene glycol ether, polyoxyethylene diol, etc.) or a polyester polyol (e.g. polyethylene adipate, polybutylene adipate, polyhexamethylene adipate, polycaprolactone, etc.). The above resin may have a urethane bond in the intermediate region of its molecule. Aside from the above-mentioned resins, it is possible to employ a moisture-curing silicone resin or an acrylic resin containing a substance which is rendered basic by exposure to moisture.

The weight ratio of said sticking resin to said moisture-curing resin is generally 90:10 through 20:80, preferably 85:15 through 40:60, and more desirably 80:20 through 50:50. If the proportion of the sticking resin is too large and that of the moisture-curing resin is too small, the desired permanent bond cannot be obtained. If the proportion of the former is too small and that of the latter is too large, the stickability of the composition is sacrificed.

It is preferable that, in the stick-adhesive layer 2 formed form said stick-adhesive composition, the moisture-curing resin is present continually between both surfaces of said layer.

If the moisture-curing resin exists in the form of an island or islands in a sea of the sticking resin, the bond strength increases as the curing reaction of the moisture-curing resin proceeds with standing time but as the time progresses further, the bond strength reaches a point of saturation and thence tends to decrease. However, since the transition from a sticking agent to an adhesive agent takes place, of course, such a layer structure can be tolerated depending on uses.

To insure that the moisture-curing resin will be distributed continually between both surfaces of the stick-adhesive layer, it is important to use a special solvent system for the stick-adhesive composition.

Thus, the solvent system to be used in the preparation of the stick-adhesive composition is preferably a system consisting of at least two solvents each dissimilar in the solubility of the sticking resin and moisture-curing resin and such that one of the solvents in which the sticking resin is more readily soluble than the moisture-curing resin is evaporated in the first place after application and the other solvent in which the moisture-curing resin is more readily soluble than the sticking resin is evaporated in the second place.

In this arrangement, even if and when the sticking resin is precipitated during preparation of the stick-adhesive composition or with the progress of subsequent drying, the moisture-curing resin still remains in solution, with the result that the moisture-curing resin may be distributed continually between two surfaces of the stick-adhesive layer 2.

The solvents mentioned above can be selected from among, for example, hydrocarbons, esters, ethers, ketones, alcohols, polyols, nitrogen-containing solvents, sulfur-containing solvents, halogenated solvents, and solvents containing two or more functional groups (e.g. OH, ester and ether groups), and these solvents are used combinedly in suitable proportions.

Whether, in the stick-adhesive layer 2, the moisture-curing resin exists continually from one surface of the layer to the other surface or as an island or islands in the sea of sticking resin can be ascertained by a variety of techniques. For example, the internal structure of the layer can be ascertained by staining the layer with a dye which shows divergent affinities for the sticking resin and moisture-curing resin and observing the stained section of the layer under a microscope or, alternatively, by treating the stick-adhesive layer 2 after curing of its moisturecuring resin component with a solvent capable of dissolving the sticking resin and examining the residual structure of the layer.

The stick-adhesive composition or the layer 2 formed therefrom can be used in a variety of uses where it must behave as a sticking agent at application but subsequently undergo spontaneous transition to an adhesive agent. However, since one of the most pertinent uses for the composition is as a transfer sheet, the mode of application of the present invention to a transfer sheet is now described in detail.

The transfer sheet essentially comprises a release sheet 1, a stick-adhesive layer 2 disposed on the releasable surface of said release sheet, and a main transfer layer 3 disposed on said stick-adhesive layer 2. The sequence of formation of the respective layers is optional. The main transfer layer 3 may for example be a printed film, film, paper, foil, vapor-deposited layer or the like and may actually be a multi-layer structure. The transfer sheet may be previously provided with suitable cutouts.

The stick-adhesive layer 2 cures in the presence of moisture. Therefore, after fabrication of the transfer sheet, a moisture-proofing means 5 is applied so that the layer 2 may remain in moisture-free condition during storage and distribution. This moistureproofing means 5 may for example be a moisture--proof wrapping which seals the whole transfer sheet or consist in the use of a moisture-proof material for said release sheet in combination with a moisture-proof sheet releasably disposed on top of the main transfer layer 3.

Among a diversity of transfer sheets that can be provided in accordance with the present invention, the sheet is preferred in which the release sheet 1 is a moisture-proof sheet, the stick-adhesive layer 2 is a layer printed according to a pattern on the releasable surface of said release sheet 1, the main transfer sheet 3 is at least one pattern-printed layer (ink layer) formed on and in substantial registry with the pattern of said stick-adhesive layer 2, and said moisture-proofing means 5 for maintaining said stick-adhesive layer in moisture-free condition is said release sheet 1 in combination with a peelable protective sheet 4 disposed on said main transfer layer 3 in such a manner that it covers an area larger than and extending beyond the pattern of said transfer layer 3.

The release sheet 1 may be a paper or plastic sheet treated with a release agent on one side. The release agent includes, inter alia, long-chain alkyl acrylate copolymers, long-chain alkyl vinyl ester copolymers, long-chain alkyl vinyl ether copolymers, long-chain alkyl acrylamide copolymers, long-chain alkyl allyl ester copolymers, long-chain alkyl derivatives of maleic acid, long-chain alkyl ester polymers, long-chain alkyl carbamate polymers, polyethyleneimine derivatives, perfluoroalkyl compounds (inclusive of fluororesin), silicone, paraffin and so on. Particularly useful for practical purposes is silicone. Aside from these agents, the sheet as such may be made of a release material or the sheet may contain a release agent internally added in the course of manufacture of the sheet.

The pattern-printing of the releasable surface of the release sheet 1 with the stick-adhesive composition can be accomplished by a desired printing technique such as screen printing. For screen printing, the viscosity of the stick-adhesive composition is usually adjusted to 1 to 300 poises (reading of a BH rotary viscosimeter at 25° C.). The stick-adhesive layer 2 may be a single layer or a plurality of layers.

In the printing of the release sheet 1 with the stick-adhesive composition, there are cases in which the surface being printed repels the composition or an accurate pattern cannot h=reproduced. In such cases, it is good practice to incorporate traces or small amounts of a surface active substance, such as silicone and other surfactants, in the stick-adhesive composition.

After formation of said stick-adhesive layer 2 on said release sheet 1, the main transfer layer (ink layer) 3 consisting of a single or plural patternprinted layers is formed in such a manner that the pattern of the layer 3 will coincide with the pattern of said stick-adhesive layer 2. The ink that can be used for this purpose is virtually unlimited and includes, inter alia, clear inks, colored inks, ultraviolet-curing ink, electron beam-curing ink and a diversity of functional inks (e.g. electrically conductive, thermo-color, fluorescent, light storage, reflective, fragrant, magnetic, OCR, desensitizing, resist, transfer printing and other inks).

Lastly, on top of the main transfer layer 3, there is provided a peelable protective sheet 4 in such a manner that it covers an area larger than and extending beyond the pattern on said main transfer layer 3.

The protective sheet 4 is advantageously a film or sheet made of a polyolefin, polyvinyl chloride, polyester, polyamide, polyurethane, polyimide, cellulose derivative, polyacetal or the like and coated either thoroughly or partially with a coating agent imparting a mild degree of sticking property depending on the intended application. It is also possible to use a plurality of protective sheets in superimposition so as to impart added body to the whole sheet. The protective sheet may also be formed by printing.

When a moisture-proof sheet is used as said release sheet 1 and, also, as said protective sheet 4, the main transfer layer 3 is sandwiched between the release sheet 1 and the protective sheet 4 so that the moisture-free condition mentioned hereinbefore can be insured. Therefore, in this instance, the release sheet 1 and the protective sheet 4 function as said moisture-proofing means for maintaining the stick-adhesive layer 2 in moisture-free condition.

The transfer printing sheet described above has a laminar configuration of (1)/(2)/(3)/(4) and it is a usual practice to construct the layers starting with (1). However, all that is necessary is that the above configuration be finally implemented and there is no limitation on the order of formation of the layers.

To facilitate the transfer process, the bonding strength between the release sheet 1 and stick-adhesive layer 2 is set to a lowest value, that between the main transfer layer 3 and protective sheet 4 to an intermediate value and that between the stick-adhesive layer 2 and the substrate to a highest value.

Since the stick-adhesive layer 2 is sticky, the substrate may be optional in kind. Thus, the substrate includes organic and inorganic materials such as metals, plastics, coated surfaces, wood, bamboo, ceramics, paper, woven fabrics, nonwoven fabrics, leather, porcelains and so on.

The transfer procedure is as follows. First, the protective sheet 4 is released with the fingers or a jig and the laminated structure consisting of the stick-adhesive layer 2, main transfer layer 3 and protective sheet 4 is removed from the release sheet 1. Then, the stick-adhesive layer of the laminated structure is pressed against a substrate and the protective layer (4) alone is peeled off.

The present invention provides the following advantages.

Since the stick-adhesive layer 2 acts as a sticking agent, it can be stuck to any substrate, irrespective of its material, with one-touch ease.

Since the stick-adhesive layer 2 cures upon exposure to atmospheric moisture, it gradually cures as stuck to the substrate after it has contacted the air in application.

Where, in the stick-adhesive layer formed from the stick-adhesive composition of the invention, said moisture-curing resin exists continually from one surface of the layer 2 to the other surface, progression of the curing reaction results in a firm permanent bond between the substrate and the main transfer layer.

Thus, in the present invention, the sticking resin and moisture-curing resin constituting the stick-adhesive layer 2 can fully display their respective characteristic properties. In other words, the sticking resin plays its role completely at application to the substrate and, after application, the moisture-curing resin discharges its duty completely Furthermore, while the moisture-curing resin is playing its role, the sticking resin assures a sustained contact between the composition and the substrate, with the result that the desired adhesion can be materialized with intimate contact maintained therebetween. In addition, whereas the moisture-curing resin by itself is inherently deficient in low-temperature impact resistance, the presence of the sticking resin in the composition of the invention obviates the problem of this deficiency in low-temperature impact resistance.

The transfer sheet having the stick 2 according to the present invention can be launched into market distribution as such, namely carrying the stick-adhesive layer 2, provided that the aforesaid moisture-proofing means 5 is provided for maintaining the stick-adhesive layer 2 in moisture-free condition (for example, the interposition of the stick-adhesive layer 2 between the release sheet 1 and the protective sheet 4), for such moisture-proofing means 5 prevents curing of the moisture-curing resin for a period of several months to more than a year. The user may purchase this transfer sheet and apply it to the substrate he desires with one-touch ease.

When the stick-adhesive layer 2 of the present invention is applied to a transfer sheet, the curing reaction of the moisture-curing resin in the stick-adhesive layer 2 proceeds from the edge of the transferred layer, thus insuring a high anchoring effect with respect to the substrate at the edges where the highest adhesive strength is required.

The following examples are further illustrative of the invention and should by no means be construed as defining the metes and bounds of the invention.

EXAMPLE 1

A sticking resin solution prepared by dissolving n-butyl acrylate-vinyl acetate (7:3 by weight) copolymer in ethyl acetate-toluene (resin content 40%, viscosity 5000 cps/25° C.) was mixed with a moisture-curing resin solution prepared by dissolving a urethane resin in ethyl acetate-toluene (resin content 50%, viscosity 1000 cps/25° C.) in a predetermined ratio to make a total of 100 parts. The mixture was then diluted with 50 parts of ethylene glycol monoethyl ether acetate which is a good solvent for both the sticking resin and moisture-curing resin to provide Composition B.

On the other hand, the above-mentioned sticking resin solution and moisture-curing resin solution were mixed in a predetermined ratio to make a total of 100 parts. This mixture was diluted with 50 parts of a solvent mixture consisting of 70% of diethylene glycol ethyl ether acetate, which is a good solvent for both the sticking resin and moisture-curing resin, and 30% of dimethyl sulfoxide, which is a good solvent for said moisture-curing resin but a poor solvent for said sticking resin to provide Composition A.

Using a bar coater with a clearance of 0.1 mm, each of Composition A and Composition B was coated on releasable side of a polyester release sheet 1. After 10 minutes of drying at 80° C., a protective sheet 4 comprising a polyvinyl chloride film carrying a weakly sticking layer was superimposed and pressed on the coated side. This laminate was cut to a width of 5 mm and, after the protective sheet 4 was peeled off, applied to the untreated side of a 125 μm thick polyester substrate film. The assembly was allowed to stand and the peeling strength was sequentially measured. The results are set forth below. The mixing ratios shown are by weight of the sticking resin solution/moisture-curing resin solution.

(a) When Composition A was used

| Time in days | Mixing ratio | | | | |
|---|---|---|---|---|---|
| | 100/0 | 90/10 | 80/20 | 70/30 | 60/40 |
| Immediately after application | 330 | 280 | 300 | 330 | 350 |
| 4 | 300 | 300 | 360 | 360 | 380 |
| 11 | 330 | 340 | 390 | 400 | 430 |
| 18 | 330 | 350 | 420 | 430 | 490 |
| 25 | 330 | 380 | 470 | 490 | 480 |
| 32 | 310 | 400 | 465 | 490 | 480 |
| 39 | 310 | 430 | 470 | 480 | 480 |
| 46 | 310 | 430 | 470 | 480 | 485 |
| 53 | 320 | 430 | 460 | 480 | 470 |

*Each figure represents peeling strength (g/5 mm).

(b) When Composition B was used

| Time in days | Mixing ratio | | | | |
|---|---|---|---|---|---|
| | 100/0 | 90/10 | 80/20 | 70/30 | 60/40 |
| Immediately after application | 330 | 280 | 330 | 370 | 400 |
| 4 | 300 | 320 | 340 | 420 | 380 |
| 11 | 330 | 320 | 360 | 410 | 360 |
| 18 | 330 | 350 | 420 | 400 | 320 |
| 25 | 330 | 370 | 360 | 360 | 340 |
| 32 | 310 | 390 | 360 | 340 | 320 |
| 39 | 310 | 410 | 340 | 350 | 320 |
| 46 | 310 | 340 | 340 | 360 | 310 |
| 53 | 320 | 320 | 300 | 320 | 310 |

*Each figure represents peeling strength (g/5 mm).

In both cases (a) and (b), the mode of attachment at the mixing ratio of 100/0 was by sticking irrespective of standing time and with regard to the mixing ratios of 90/10, 80/20, 70/30 and 60/40, the mode of attachment was still by sticking up to around day 20 but was substantially by adhesion after day 30.

Microscopic observation of the stained section of the cured stick-adhesive layer 2 revealed that whereas the moisture-curing resin was found to be dispersed in the insular fashion in the case of (b) where Composition B was used, it existed continually from one surface of the stick-adhesive layer 2 to the other surface in the case of (a) where Composition A was used.

EXAMPLE 2

Among a series of Composition A prepared in the same manner as Example 1, the composition corresponding to the mixing ratio of 75:25 (sticking resin/moisturecuring resin, by weight) was coated on the releasable side of a polyester release sheet 1 by means of a bar coater with a clearance of 0.1 mm, followed by drying at 80° C. for 10 minutes. A protective sheet 4 consisting in a polyvinyl chloride film carrying a weakly sticking layer was then laminated.

The whole laminate was cut to a width of 5 mm and stuck to various substrates, viz. stainless steel sheet, rigid polyvinyl chloride plate, polymethyl methacrylate plate, polystyrene plate and polyurethane-coated plate (which are referred to as Substrates 1, 2, 3. 4 and 5 respectively) Each assembly was then allowed to stand and the peeling strength was sequentially determined.

The results are set forth below.

| Time in days | Substrate | | | | |
|---|---|---|---|---|---|
| | 1 | 2 | 3 | 4 | 5 |
| 1 | 260 | 360 | 370 | 380 | 220 |
| 7 | 310 | 390 | 415. | 405 | 315 |
| 14 | 330 | 420 | 440 | 430 | 380 |
| 25 | 380 | 450 | 460 | 450 | 420 |

*Each figure represents peeling strength (g/5 mm).

In contrast, in cases where the sticking resin solution alone was used, the peeling strength was about 120 g/5 mm for Substrate 1, about 220 g/5 mm for Substrate 2, about 245 g/5 mm for Substrate 3, about 220 g/5 mm for Substrate 4 and about 210 g/5 mm for Substrate 5, irrespective of the passage of time.

EXAMPLE 3

FIG. 1 is a schematic cross-section view showing an exemplary transfer sheet according to the present invention.

On the releasable side of a 125 μm thick polyester release sheet 1, a pattern was screen-printed with Composition A wherein the weight ratio of sticking resin to moisture-curing resin was 70:30, followed by drying to provide a stick-adhesive layer 2.

This stick-adhesive layer 2 was screen-printed with a colored ink in exact registry with the pattern of the layer 2 followed by drying to provide a main transfer layer (ink layer) 3. (Incidentally, this main transfer layer 3 is formed as multiple layers in many cases).

The above procedure gave a transfer layer consisting of the stick-adhesive layer 2 and main transfer layer 3 on the release sheet 1. Then, a protective sheet 4 comprising a polypropylene film carrying a weakly sticking layer was superimposed on the above transfer layer and the assembly was passed with a pair of rubber rollers to provide an integral sheet.

The transfer sheet (transfer printing sheet) thus obtained has a laminar configuration of (1)/(2)/(3)/(4). Then, a half-cut is made between patterns on the protective sheet 4 side to provide individual transfer printing sheets.

From this transfer printing sheet, the laminate of (2)/(3)/(4) was removed from the release sheet (1) by holding one end of the protective sheet (4) with fingers and the stick-adhesive layer 2 is applied against an ABS resin plate and pressed down with fingers a few times. Then, the protective sheet 4 was peeled off, whereupon only the pattern of the transfer layer consisting of 2 and 3 remained on the ABS plate. Thus, transfer printing could be consummated with fingertip ease. The change in peeling strength with time was investigated using a large number of individual transfer printing sheets.

The transfer-printed ABS resin plates were allowed to stand and serially subjected to the peeling test described above, 5 sheets at each time. The results were as follows.

| Time in days | Peeling strength (g/5 mm) |
| --- | --- |
| Immediately after printing | 360 |
| Day 1 | 380 |
| Day 4 | 420 |
| Day 11 | 430 |
| Day 18 | 440 |
| Day 25 | 435 |
| Day 39 | 435 |
| Day 46 | 430 |
| Day 90 | 435 |

Observation of the peeling state revealed that whereas the mode of attachment was by sticking up to day 3, it was substantially by adhesion after day 5.

EXAMPLE 4

The transfer printing sheets of Example 3 were allowed to stand indoors, without packaging, for 1, 2, 3 and 6 months.

Using the transfer printing sheets left standing for the above-mentioned time periods, transfer to the untreated side of a polyester film was carried out in the same manner as Example 3. The peeling test was performed after a further standing time of 15 days.

The results were as follows.

| Time before transfer | Time after transfer | Peeling strength (g/5 mm) |
| --- | --- | --- |
| 1 Months | 15 Days | 430 |
| 2 Months | 15 Days | 430 |
| 3 Months | 15 Days | 420 |
| 6 Months | 15 Days | 420 |

What is claimed is:

1. A transfer sheet comprising a release sheet, a stick-adhesive layer disposed on the releasable side of said release sheet and formed form a stick-adhesive composition comprising a sticking resin capable of functioning as a sticking agent for sustained contact to a substrate and a moisture-curing resin curable upon exposure to atmospheric moisture to provide an adhesive to a substrate, the resins of the stick-adhesive being in a weight ratio of sticking resin to moisture-curing resin in the range of 90:10 through 20:80 based on nonvolatile matter thereof, a main transfer layer disposed on said stick-adhesive layer opposed form said release sheet, and a moisture-proofing means disposed on said main transfer layer and adapted to maintain said stick-adhesive layer in moisture-free condition, said release sheet is a moisture-proof sheet, said stick-adhesive layer is a pattern-printed layer formed on the releasable side of said release sheet, said main transfer layer is at least one pattern-printed layer having a pattern in registry with that of said stick-adhesive layer, and said moisture-proofing means for maintaining said stick adhesive layer in moisture-free condition comprises said release sheet in combination with a peelable protective sheet disposed on said main transfer layer in such a manner that it covers an area larger than and extending the pattern of said main transfer layer.

2. The transfer sheet of claim 1 wherein the moisture-curing resin extends continually from one surface of the stick-adhesive layer to the other surface.

* * * * *